Patented Dec. 16, 1947

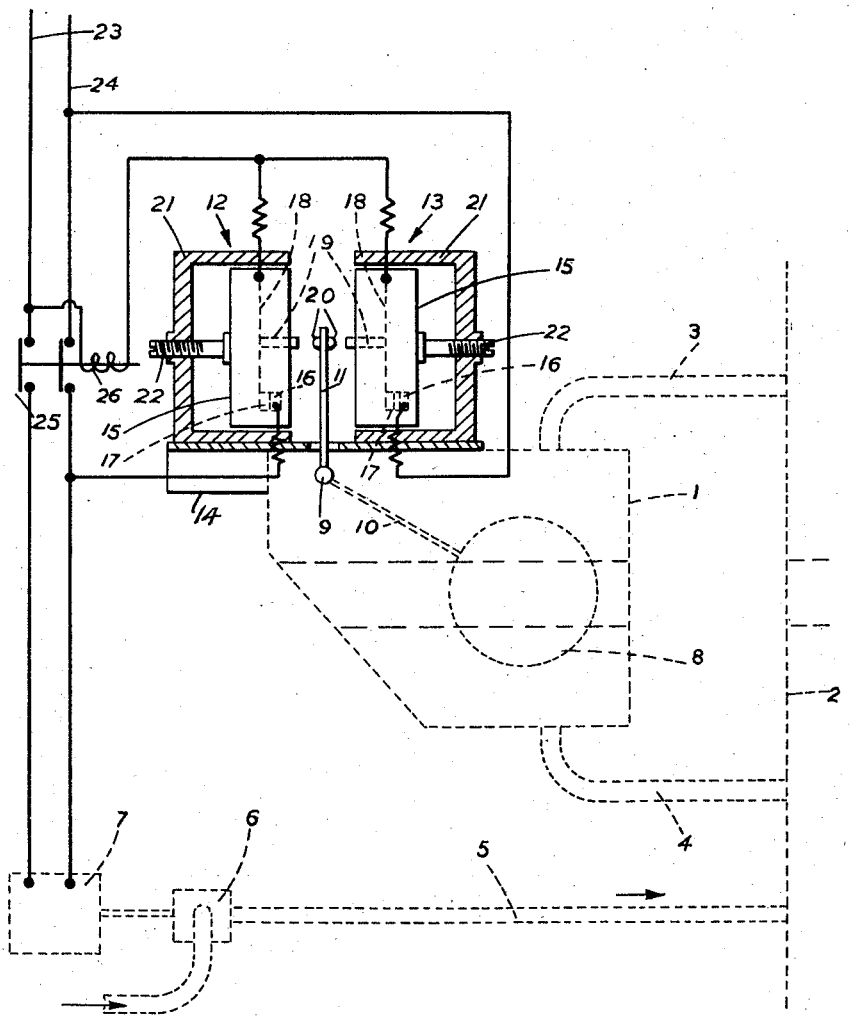

2,432,965

UNITED STATES PATENT OFFICE 2,432,965

FEED-WATER REGULATOR

Bernard Alfred Corke, Slough, England, assignor to Ronald Trist & Co. Limited, Slough, England, a British company Application March 9, 1945, Serial No. 581,862
In Great Britain April 14, 1944

8 Claims. (Cl. 103—26)

1

This invention relates to apparatus for regulating the operation of pumps or other supply apparatus by which feed water is supplied to steam boilers or feed liquid is supplied to similar containers for liquid.

It is common practice to supply feed water to boilers by means of a pump driven by an electric motor and to control the motor by push-button switches, one of which is pushed against a spring to start the motor and the other of which is pushed against a spring to stop the motor. It is also common practice to employ such push-button switches to actuate valves or the like to control the supply of feed water to boilers. In apparatus of this kind there is no automatic control, the switches being manually operated.

Other forms of apparatus such as valves or the like are automatically controlled through a float which rises and falls with the water in the boiler and which serves at a predetermined low level to close a switch by which the motor is started or the valve or the like actuated. It is possible so to construct the switch that the float has to rise by a predetermined amount before the switch circuit is broken and the motor and pump are stopped. However, this amount is fixed when the switch is manufactured and it cannot be easily and simply adjusted.

The primary object of this invention is to provide an apparatus which automatically starts the supply of water when a predetermined low level is reached and continues such supply of water until a predetermined high level is reached.

A further object is to enable ready adjustment of the apparatus to vary the levels at which the supply of feed water is started and stopped.

In the preferred form of my invention a float is arranged in one position to actuate a low-level switch and in another position to actuate a high-level switch, and the circuits are so arranged that when the low-level switch has been actuated to start the motor, the latter will continue to run and to drive the pump until the high-level switch is actuated.

The invention will be more clearly understood by reference to the accompanying diagrammatic drawing, which shows an arrangement for supplying feed water to a boiler.

A float chamber 1 is placed alongside a boiler 2 and connected to it by pipes 3 and 4 which run from the steam and water spaces of the boiler, respectively. When it is desired to maintain the water in the boiler between the high and low levels indicated by broken lines, feed water is supplied through a pipe 5 by a pump 6 driven by an electric motor 7.

A float 8 is provided in the float chamber 1 and is rigidly connected to a rocking shaft 9 by an arm 10. The shaft 9 passes through the wall of the chamber 1 and outside said chamber, it carries a radial arm 11 which lies between two switches 12 and 13, respectively. These two switches are carried by a bracket 14 extending from the float chamber 1. Each switch comprises a housing 15 in which there is a fixed contact 16 and a movable contact 17. Each contact 17 is mounted on the end of a resilient arm 18 from which an abutment 19 projects towards the arm 11 in position to be struck by one or the other of two striking surfaces 20 on the arm 11. Each housing 15 is mounted in a casing 21 and can be moved as a whole towards and away from the arm 11 by turning a screw 22 which passes through a threaded opening in the casing 21.

The switch, 12 is a high-level switch and in it the contacts 16 and 17 are normally closed, but when the float 8 reaches the predetermined high level the arm 20 has been rocked anti-clockwise a sufficient distance to move the contact 17 away from the contact 16. In other words, the switch 12 is open when, but only when, the water in the boiler is at or above high level.

The switch, 13 is a low-level switch and its contacts are normally open, but when the float 8 reaches the predetermined low level, the arm 20 has been rocked clockwise a sufficient distance to move the contact 17 into contact with the contact 16 in the switch 13. In other words, the switch 13 is closed when, but only when, the water in the boiler is at or below high level.

The feed pump motor 7 is fed with current through electrical conductors 23 and 24 in which a relay 25, actuated by a solenoid coil 26, is inserted, so that the motor 7 can run only so long as the relay is closed, that is to say, only so long as the solenoid 26 is energised. This solenoid 26 is connected on the one hand to the conductor 23 and on the other hand to both the moving contacts 17. The two fixed contacts 16 are independently connected to the conductor 24 on opposite sides of the relay 25, the low-level switch being connected on the side of the relay remote from the motor 7. It will be seen that the relay 25 is included in two circuits, one through the switch 12 and the other through the switch 13.

In operation, and assuming that the water has reached the predetermined high level, both circuits are open, that is to say, both switches 12 and 13 are broken, and the pump 6 is stopped.

As the level falls, the arm 11 allows the high-level switch 12 to close, but the relay 25 will not then be actuated. When the water falls to the predetermined low level, the low-level switch 13 will be closed and thus the relay 25 will be actuated by the closing of the circuit containing both it and the low-level switch 13, and the motor 7 will thereupon start and drive the pump 6. If the water level rises sufficiently, the low-level switch 13 will be allowed to open again due to the anti-clockwise movement of arm 11, but it will be noted that the circuit containing the high-level switch 12 is closed, so the motor 7 will continue to run until the predetermined high level is reached in float chamber 1.

A particular advantage attained by means of the preferred form of the invention above described is that it is a simple matter to vary the levels at which the switches are operated, since it is only necessary to adjust the positions of one or both of the housings 15 in the casings 21 by means of the screws 22.

Instead of providing a member which moves between spring contact switches, the float may rock a cam shaft having two cams, each operating one such switch.

The invention is not limited to apparatus for controlling the supply of feed water to boilers but is applicable generally to apparatus for controlling the supply of liquids to containers. For instance, the liquid controlled may be sugar juice supplied to an evaporator. Further, the invention is not limited to apparatus including a motor driven pump, as, obviously, the solenoid 26 could actuate a valve located in a water pressure conduit leading to the boiler or other liquid container, and would function to control the opening and closing movements of such valve in accordance with the liquid level within the boiler or container. Other changes in the shape, size and arrangement of parts will be readily apparent to those skilled in the art to which the invention relates, and may be made without departing from the spirit of the invention or from the scope of the subjoined claims.

I claim:

1. In an apparatus for controlling the supply of liquid to a container in accordance with the liquid level in the container, in combination, a feed pump, an electric motor connected to drive said pump, a low-level spring contact switch, a high-level spring contact switch located adjacent but spaced in opposed relation from said low-level switch, a float responsive to the liquid level in the container, a member connected to move with said float and disposed between said switches to actuate said low-level switch in one position of said float and to actuate said high-level switch in another position of said float, and electric means operative to start said motor upon the actuation of said low-level switch and to maintain said motor running until the subsequent operation of said high-level switch.

2. In an apparatus for controlling the supply of liquid to a container in accordance with the liquid level in the container, in combination, a feed pump, an electric motor connected to drive said pump, a normally open low-level switch, a normally closed high-level switch, a float responsive to the liquid level in the container, a member actuated by said float and operative in one position to actuate said low-level switch and in another position to actuate said high-level switch, and electric means operative to start said motor upon the actuation of said low-level switch by said float-actuated member and to maintain said motor running until the subsequent operation of said high-level switch by said float-actuated member, said electric means including a motor circuit and a relay coil in said motor circuit, and means for energizing said coil including two branch circuits, each including one of said switches, the branch circuit including said high-level switch being completed only when said relay is energised.

3. In a boiler installation, a boiler, a float chamber connected to the steam and water spaces of said boiler, a feedwater pump, an electric motor connected to drive said pump, a low-level switch, a high-level switch, a float in said float chamber and responsive to the water level in said container, means operated by said float and operative in one position to actuate said low-level switch and in another position to actuate said high-level switch, and electric means operative to start said motor upon the actuation of said low-level switch and to maintain said motor running until the subsequent operation of said high-level switch.

4. In an apparatus for controlling the supply of liquid to a container in accordance with the liquid level in the container, in combination, a feed pump, an electric motor connected to drive said pump, a source of electric current, electric connections serving to place said source and said motor in circuit, a switch in said circuit, a solenoid coil for actuating said switch, a spring contact low-level switch biased to open, a spring contact high-level switch biased to close, electric connections serving to complete a circuit through said low-level switch, said solenoid coil and said source when said low-level switch is closed, further electric connections serving to complete a circuit through said high-level switch, said solenoid and said source when said first-mentioned switch is closed, and a float responsive to the liquid level in the container and operative at low level to close said low-level switch and at high level to open said high-level switch.

5. In an apparatus for controlling the supply of liquid to a container in accordance with the liquid level in the container, in combination, a source of liquid supply, electrically-actuated means for controlling the supply of liquid from the source to the container, electric circuit means for energizing said electrically actuated means and including a relay, an energizing circuit for said relay, said energizing circuit including a normally open low-level switch and a normally closed high-level switch connected in parallel with the actuating coil of said relay and connected to said first mentioned circuit on opposite sides of said relay with the high-level switch connected to the first mentioned circuit between the relay and said electrically actuated means, and float means responsive to the level of the liquid in the container for actuating said high and low-level switches whereby said electrically actuated means is energized when the low-level switch is closed and is maintained energized until the high-level switch is opened.

6. An apparatus as defined in claim 5, wherein the electrically actuated means is an electrically operated pump.

7. An apparatus as defined in claim 5, wherein the said low-level switch and high-level switch are arranged in opposed, spaced relation, and wherein a member responsive to movement of the float is operable between said switches to operate the same.

8. An apparatus as defined in claim 5, wherein the said low-level switch and high-level switch are arranged in opposed, spaced relation and include means for varying the spacing between said switches, and in which a member responsive to movement of the float is operable between said switches to operate the same, the spacing between said switches determining the extent of the range between high and low levels of the liquid in the container.

BERNARD ALFRED CORKE.

REFERENCES CITED

The following references are of record in the file of this patent:

UNITED STATES PATENTS

| Number | Name | Date |
| --- | --- | --- |
| 1,346,898 | Kingsbury | July 20, 1920 |
| 1,637,425 | Nagel | Aug. 2, 1927 |
| 1,979,127 | Warrick | Oct. 30, 1934 |
| 2,061,608 | Beckwith et al. | 1936 |
| 2,219,472 | Defaudorf et al. | 1940 |